(12) United States Patent
Saurwalt (10) Patent No.: US 12,257,776 B2
(45) Date of Patent: Mar. 25, 2025

(54) PELLET EXTRUDER FOR 3D PRINTING

(71) Applicant: Admatec Europe B.V., Alkmaar (NL)

(72) Inventor: Jacob Jan Saurwalt, Alkmaar (NL)

(73) Assignee: Admatec Europe B.V., Alkmaar (NL)

( * ) Notice: Subject to any disclaimer, the term of this patent is extended or adjusted under 35 U.S.C. 154(b) by 0 days.

(21) Appl. No.: 17/913,167

(22) PCT Filed: Mar. 24, 2021

(86) PCT No.: PCT/EP2021/057511
§ 371 (c)(1),
(2) Date: Sep. 21, 2022

(87) PCT Pub. No.: WO2021/191244
PCT Pub. Date: Sep. 30, 2021

(65) Prior Publication Data
US 2023/0139210 A1   May 4, 2023

(30) Foreign Application Priority Data

Mar. 25, 2020  (EP) .................................. 20165465

(51) Int. Cl.
*B29C 64/209* (2017.01)
*B29C 64/393* (2017.01)
(Continued)

(52) U.S. Cl.
CPC .......... *B29C 64/209* (2017.08); *B29C 64/393* (2017.08); *B33Y 30/00* (2014.12); *B33Y 50/02* (2014.12)

(58) Field of Classification Search
CPC ..... B29C 64/209; B29C 64/393; B33Y 30/00; B33Y 50/02
See application file for complete search history.

(56) References Cited

U.S. PATENT DOCUMENTS 4,211,523 A * 7/1980 Hunerberg .......... B29C 44/3446
261/45
4,478,644 A * 10/1984 Berger ..................... C13K 1/02
127/1

(Continued)

FOREIGN PATENT DOCUMENTS

CN    103692653 B    4/2014
CN    106623936 A    5/2017
(Continued)

*Primary Examiner* — Nahida Sultana
(74) *Attorney, Agent, or Firm* — PEARL COHEN ZEDEK LATZER BARATZ LLP (57) ABSTRACT

Extruder based print head (1) for 3D printing with a material feed unit (2) for providing material in granular and/or liquid feed form, a material extrusion unit (3) arranged to receive the material in granular and/or liquid feed form and transform the material into liquefied material in print form, and a nozzle unit (4) in fluid communication with the material extrusion unit (3), the nozzle unit (3) comprising an output channel (5) and a nozzle (6) arranged to output the liquefied material. Furthermore, an internal volume enlargement unit (7) is provided in fluid communication with the output channel (5) of the nozzle unit (4), wherein the internal volume enlargement unit (7) has a first internal volume in a first operational status and a second internal volume in a second operational status, wherein the second internal volume is larger than the first internal volume.

15 Claims, 6 Drawing Sheets

(51) Int. Cl.
B33Y 30/00 (2015.01)
B33Y 50/02 (2015.01)

(56) References Cited

U.S. PATENT DOCUMENTS

| | | | | |
|---|---|---|---|---|
| 4,752,488 | A * | 6/1988 | Hayashi | A21C 15/007 |
| | | | | 426/94 |
| 5,983,978 | A * | 11/1999 | Vining | B22D 17/2015 |
| | | | | 366/78 |
| 6,638,049 | B1 | 10/2003 | Moss et al. | |
| 11,660,811 | B1 * | 5/2023 | Contractor | B29C 64/343 |
| | | | | 425/375 |
| 2008/0224353 | A1 * | 9/2008 | Schultz | F16K 3/246 |
| | | | | 137/625.48 |
| 2014/0328964 | A1 * | 11/2014 | Mark | B29C 64/118 |
| | | | | 425/166 |
| 2017/0210069 | A1 * | 7/2017 | Stubenruss | B29C 64/118 |
| 2019/0070778 | A1 | 3/2019 | Haid et al. | |
| 2019/0217537 | A1 * | 7/2019 | Li | B33Y 10/00 |
| 2020/0016834 | A1 * | 1/2020 | Yuwaki | B33Y 30/00 |

FOREIGN PATENT DOCUMENTS

| | | |
|---|---|---|
| CN | 110901052 A | 3/2020 |
| JP | 2016-215581 | 12/2016 |
| JP | 2019-533593 | 11/2019 |
| WO | 2019/116088 A1 | 6/2019 |

* cited by examiner

PELLET EXTRUDER FOR 3D PRINTING

FIELD OF THE INVENTION

The present invention relates to a an extruder based print head for 3D printing, comprising a material feed unit for providing material in granular and/or liquid feed form, a material extrusion unit arranged to receive the material in granular and/or liquid feed form and transform the material into liquefied material (i.e. molten by temperature and/or pressure) in print form, and a nozzle unit in fluid communication with the material extrusion unit, the nozzle unit comprising an output channel and a nozzle (or output aperture) arranged to output the liquefied material.

BACKGROUND ART

International patent publication WO2018/086792 discloses a print head for a 3D printer with a feed for feedstock with variable viscosity, a melting zone comprising a temperature control element and an outlet opening for the liquid phase of said feedstock for conveying the feedstock from the feed zone into the melting zone comprises a plunger that can be inserted into said feed zone.

Chinese patent publication CN103692653B discloses a melt differential three-dimensional printer comprising a material melting unit, a droplet ejection unit, a cylindrical coordinate system forming unit and a frame. In the material melting unit, a servo motor drives a screw to rotate through a feeding port. Poured plastic pellets are mixed and sheared, and a heater fixed in a barrel to ensure the complete plasticization of the pellets through a temperature control, and the molten material is conveyed by the screw to the droplet ejection unit. In the droplet ejection unit, the molten material is transported to the valve body along a hot runner in a runner plate, driven by a linear servo motor. The linear servo motor drives a valve needle to reciprocate in the valve body, and the molten material is extruded out of a nozzle to form a melt droplet.

SUMMARY OF THE INVENTION

The present invention seeks to provide an improved print head for 3D printing of objects, which is based on extrusion of granular form feed material, e.g. pellets of a basic material, or liquid form feed material e.g. melted plastic.

According to the present invention, an extruder based print head as defined above is provided, further comprising an internal volume enlargement unit in fluid communication with the output channel of the nozzle unit, wherein the internal volume enlargement unit has a first internal volume in a first operational status and a second internal volume in a second operational status, wherein the second internal volume is larger than the first internal volume, and where the internal volume enlargement unit comprises an expansion volume within the material extrusion unit, and an actuator connected to an extrusion screw, which actuator is arranged to linearly move the extrusion screw within the expansion volume to retract the liquefied material into the expansion volume.

By creating an enlargement of the internal volume present in the printing head, any pressure in the liquefied material is taken away instantly, allowing the print head to be moved to a new print position without any dripping or stringing.

SHORT DESCRIPTION OF DRAWINGS

The present invention will be discussed in more detail below, with reference to the attached drawings, in which.

DESCRIPTION OF EMBODIMENTS

In 3D printing of plastics, the most popular technique known in the art is wire extrusion, more commonly known as Fused Deposition Modeling (FDM). In FDM, threads of solid plastic filament directly feed into the 3D printer heating chamber, where the plastic filament melts into a liquefied form. The liquefied plastic filament is compressed through a nozzle unit, and is forcibly dispensed onto a solid platform, where it re-solidifies.

In FDM, the desired object is typically built in layers. To print an object of a certain shape, the nozzle unit may have to move to a different location, causing the printing to stop. Typically, during the moving process, this leaves small strings of plastic behind due to plastic oozing out of the extrusion nozzle. This is known as stringing, and it may leave undesired strings of plastic on the finished object. To solve this issue, before subsequently moving to a different location for further printing, the plastic filament retracts back into the nozzle unit. This technique is commonly known as retraction, and as such is known in the art.

3D plastic printing is also possible using pellet extrusion. In this technique, instead of plastic filament thread, granules directly feed into the heating chamber. The advantage of pellet extrusion is that this does not limit granules to a plastic material, and metallic or ceramic compound materials may also be used. A further advantage is that plastic granules can be significantly cheaper than threads of plastic filament, saving printing costs. The disadvantage of pellet extrusion is that the liquefied material does not comprise a retraction mechanism as the pellets are gravity fed. This severely limits the scope of the object printing, since the nozzle unit cannot move to a different location without significant stringing. There is a need in the art to overcome this disadvantage.

The present invention embodiments provide solutions for obtaining retraction in a 3D printing system that employs the pellet extrusion technique.

Figure 1:
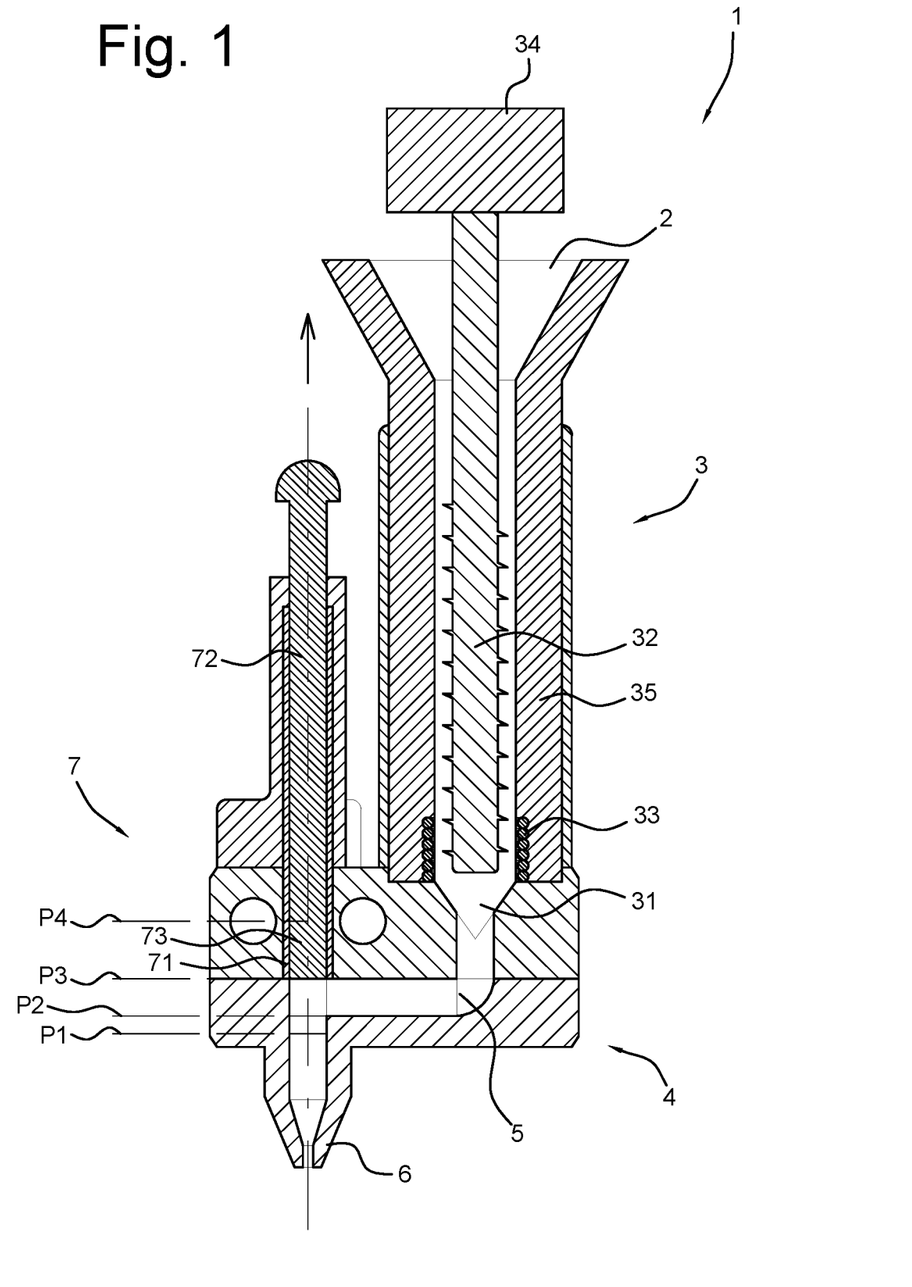
FIG. 1 shows a cross sectional view of an extruder based print head for 3D printing according to an embodiment of the present invention.

FIG. 1 shows a cross sectional view of an extruder based print head 1 for 3D printing according to an exemplary embodiment of the present invention. A material feed unit 2 receives the material in granular and/or liquid feed form. The granular and/or liquid feed material passes through the material feed unit 2, and enters a material extrusion unit 3. Once liquefied, the material enters a nozzle unit 4 having an output channel 5 in fluid connection with a nozzle 6.

In the embodiment shown in FIG. 1, the material extrusion unit 3 comprises a compression chamber 31, an extrusion screw 32 and one or more temperature control elements 33. The material extrusion unit 3 is arranged to compress the granular and/or liquid feed material within the compression chamber 31. The temperature control element 33 is arranged to provide heat to the material extrusion unit 3, and works in operative association with the compression chamber 31. The temperature control element 33 may comprise, for example, heating and/or cooling elements at various positions in the material extrusion unit 3 (or even in further parts of the extruder based print head 1, see below). The temperature control element is e.g. implemented as high-resistance wires near the output side of the material extrusion unit 3 as shown in the exemplary embodiment of FIG. 1, that heat to a high temperature when an electrical current is passed through them. Additionally or alternatively, the temperature control element 33 is implemented as channels with heating or cooling fluid connected to an external heating/cooling unit (not shown).

The temperature control element 33 may be positioned in different segments or zones, e.g. at the entrance of the granulate near material feed unit 2, in the middle of the compression chamber 31 (typically for arranged for cooling) and/or at the bottom of the material extrusion unit 3, below the compression chamber 31 and around flow channels 5 or nozzle 6 of the nozzle unit 4. The material provided in granular feed form transforms into a liquefied print form in the material extrusion unit 3, from heat provided by the temperature control element 33, and/or the internal shear and compression provided by the compression chamber 31 and extrusion screw 32. Herein after, the wording 'liquefied material in print form' may also be referred to as 'liquefied material'. The liquefied material passes through the material extrusion unit 3, and enters the nozzle unit 4. Note that a further part of the temperature control element 33 may be arranged as a cooling unit blowing cooling air directed at the nozzle 6.

It is noted for the material extrusion unit 3 receiving, from the material feed unit 2, material provided in liquid feed form, heat from the temperature control element 33 and pressure from the compression chamber 31 and extrusion screw 32 may still be provided to further heat/melt the material in liquid feed form and e.g. change the viscosity and/or temperature thereof. In this respect, the material extrusion unit 3 may still modify the properties of the material provided in liquid feed form, and transform it to a liquefied (i.e. flowable) material in print form for 3D printing, and output the liquefied material in print form to the nozzle unit 4.

As shown in the embodiment of FIG. 1, the nozzle unit 4 comprises an output channel 5 and nozzle 6, arranged to further output the liquefied (i.e. flowable) material (in print form for 3D output printing). The extruder based print head 1 further comprises an internal volume enlargement unit 7 in fluid communication with the nozzle unit 4 and output channel 5. The liquefied material enters the output channel 5 from the material extrusion unit 3, and flows through the output channel 5 to the nozzle 6. The liquefied material dispenses through the nozzle 6. This allows printing of the desired object on a platform, with a continuous output flow of the liquefied material.

The internal volume enlargement unit 7 comprises an plunger channel 71 in fluid communication with the nozzle 6 and a plunger 72 moveably arranged within the plunger channel 71 for retracting the liquefied material. In a further embodiment, the plunger 72 comprises a valve device 73, arranged to close off the output channel 5, subsequently stopping the output flow of the liquefied material through the nozzle 6. In one embodiment, the valve device 73 is the end part of plunger 72 which is arranged to move up and down in a housing of the internal volume enlargement unit 7. Alternatively, the valve device 73 can withdraw out of the plunger 72, and similarly, the valve device 73 can insert back into the plunger 72.

In the embodiment shown in FIG. 1, the internal volume enlargement unit 7 has a first internal volume in a first operational status, where the plunger 72 is in the lower position P1, and a second internal volume in a second operational status, where the plunger 72 is in the middle position P2. The second internal volume is larger than the first internal volume.

In more general wording, the present invention embodiments relate to an extruder based print head for 3D printing comprising a material feed unit 2 for providing material in granular and/or liquid feed form, a material extrusion unit 3 arranged to receive the material in granular and/or liquid feed form and transform the material into liquefied material (e.g. molten by temperature and pressure) in print form, and a nozzle unit 4 in fluid communication with the material extrusion unit 3, the nozzle unit 3 comprising an output channel 5 and a nozzle (or output aperture) 6 arranged to output the liquefied material. The extruder based print head further comprises an internal volume enlargement unit 7 in fluid communication with the output channel 5 of the nozzle unit 4, wherein the internal volume enlargement unit 7 has a first internal volume in a first operational status and a second internal volume in a second operational status, wherein the second internal volume is larger than the first internal volume. A sudden local volume creation near the nozzle 6 takes away any pressure present in the output channel 5, and prevents flow of molten material through the nozzle 6.

In a further exemplary embodiment, the plunger 72 is initially in the lower position P1. The valve device 73 is implemented as the lower end part of the plunger 72, which is movable up and down in a housing of the internal volume enlargement unit 7. If the end of the valve device 73 is in (lower) position P1, it closes off the output channel 5, and stops the output flow of the liquefied material through to the nozzle 6. If the plunger 72 then moves in an upwards direction within the plunger channel 71 from the lower position P1 until the valve device is just under the output channel 5 (middle position P2), effectively an internal volume is added to the output channel 5 part towards the nozzle 6, thereby retracting a small local volume of liquefied material in an upwards direction back into the plunger channel 71. This releases any pressure present in the liquefied material close to nozzle 6, and effectively prevents stringing. If the plunger 72 is moved further up, with valve device 73 in upper position P3, the extruder based printing head 1 is in an operational status, as liquefied material can flow though the output channel 5 to the nozzle 6.

If the plunger 72 is moved with valve device 73 in position P1, and then to position P2, the extruder based print head 1 can move to a different location without any liquefied material dripping out of the nozzle 6. Once in position, the plunger 72 can then move in a upward direction within the plunger channel 71 from the middle position P2 to upper position P3. This re-opens the output channel 5 for output flow of the liquefied material through to the nozzle 6, allowing the printing to resume in a controlled manner.

In a further embodiment, the flow of liquefied material through output channel 5 is initially stopped by halting the extrusion screw 32 of the material extrusion unit 3, when the valve device 73 of the plunger 72 is in upper position P3 (open output channel 5). In order to then take away pressure in the output channel 5 and prevent liquefied material from dripping out of nozzle 6, the plunger 72 is further retracted into plunger channel 71, until the valve device 73 is in position P4. This creates the internal volume enlargement which is sufficient to prevent stringing from the nozzle 6.

In the embodiment shown in FIG. 1, the material extrusion unit comprises a cylindrical housing 35, arranged to protect the material extrusion unit 3. The compression of the granular material in the compression unit 3 generates substantial pressures that could be destructive to the extrusion unit 3, which is less in this embodiment because of the cylindrical structure. The cylindrical housing 35 is e.g. made of a material that is able to sustain the pressures generated.

In a further alternative embodiment, the valve device 73 may comprise a small opening, arranged to restrict the output flow of the liquefied material. The small opening may comprise, for example, a hole with a specific diameter. The valve device 73 may be arranged to allow rotation thereof, such that either the small opening faces the output channel 5, restricting the output flow of the liquefied material, or the small opening does not face the output channel 5, completely stopping the output flow of the liquefied material.

In a further embodiment, the valve device 73 may also comprise a small hollow pathway within the body of the plunger 72, arranged to restrict or stop the output flow of the liquefied material. The opening on either end of the small hollow pathway is arranged between a side surface of plunger 72, and an end surface of the plunger 72. The small hollow pathway may comprise, for example, a Γ shaped hollow cylinder with a specific diameter, and is in operative association with the output channel 5. Furthermore, two or even more pathways may be present with different internal diameters, with their respective openings exiting on the side surface of plunger 72. The plunger 72 may also rotate such that either (one of) the opening(s) of the small hollow pathway on the side surface of the plunger 72 either faces the output channel 5, restricting the output flow of the liquefied material, or the small opening does not face the output channel 5, stopping the output flow of the liquefied material. The opening of the small hollow pathway on the end of the plunger would be in-between position P2 and P3 as shown in FIG. 1, and the end face of plunger 72 in position P1. Material extraction would be possible by rotating the plunger device 73 to stop output flow of the liquefied material, and moving the plunger 72 upwards to position P2, for extraction of the remaining liquefied material. Printing may resume by moving the plunger downwards towards position P1, and re-rotating the plunger for output flow of the liquefied material.

Figure 2:
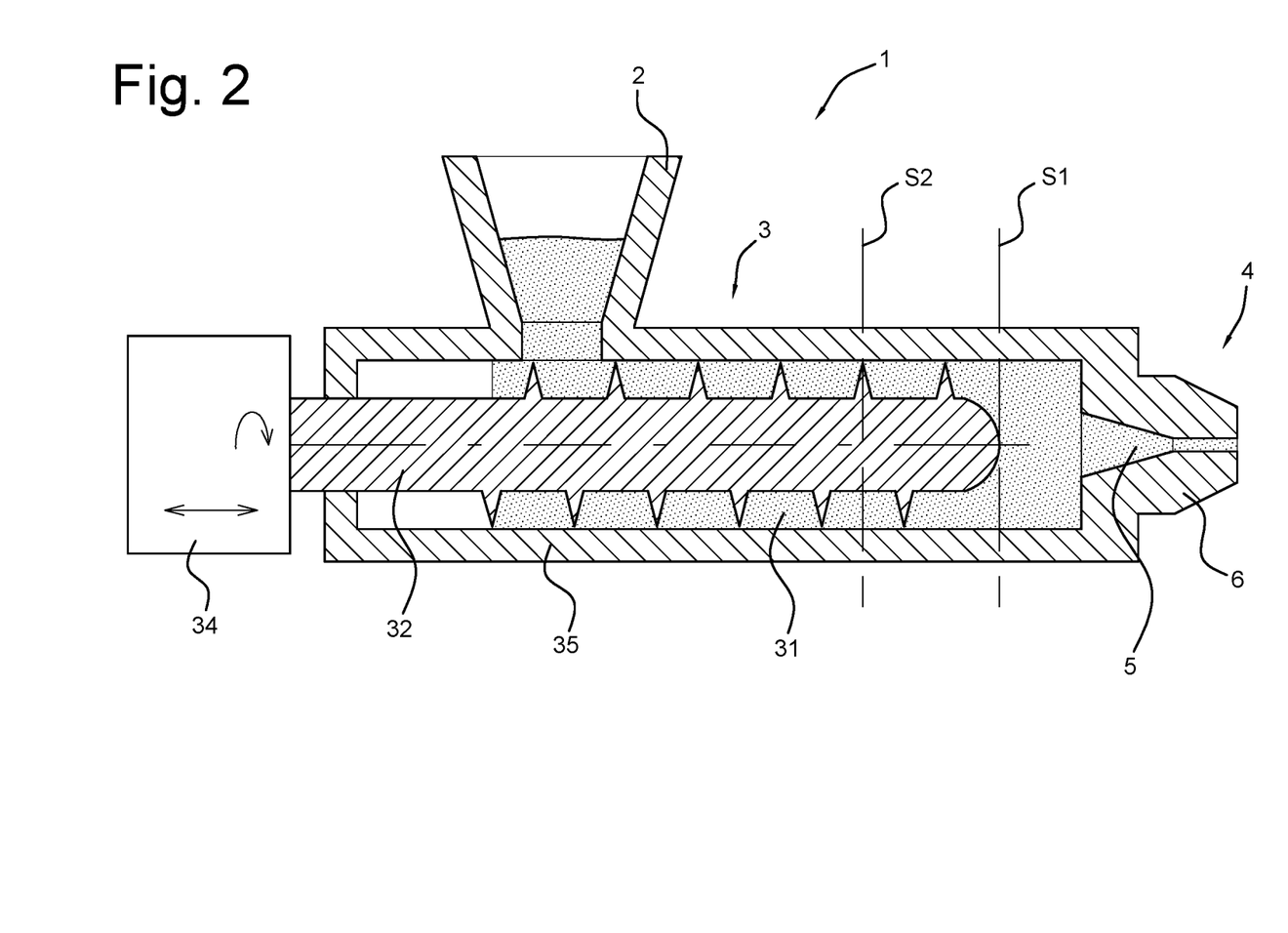
FIG. 2 shows a cross sectional view of an extruder based print head for 3D printing according to a further embodiment of the present invention.

FIG. 2 shows a cross sectional view of an extruder based print head for 3D printing according to a further embodiment of the present invention. In this embodiment, the liquefied material dispenses through the nozzle 6, but retracts into a different local volume than in the embodiments described above with reference to FIG. 1.

In the embodiment shown in FIG. 2, the internal volume enlargement unit 7 comprises an expansion volume S1-S2 within the material extrusion unit 3 itself, and an actuator 34 connected to the extrusion screw 32 for rotation thereof to compress material towards output channel 5. The internal volume enlargement unit 7 and material extrusion unit 3 are also arranged for retracting the liquefied material to prevent dripping. The actuator 34 is arranged to linearly move extrusion screw 32 within the expansion volume S1-S2. The internal volume of the compression chamber 31 with an end of the extrusion screw 32 at position S2 is larger than the internal volume at position S1.

The liquefied material dispenses through the nozzle 6. By using an actuator 34 to linearly move the extrusion screw 32 in a direction to expand the internal volume by moving the end face of extrusion screw 32 from position S1 to position S2, the liquefied material present below the end of the extrusion screw 32 retracts into the expansion volume S1-S2. This effectively prevents stringing.

In the embodiment shown in FIG. 2, the extruder based print head 1 may then move to a different print location. By using an actuator 34 to linearly move the extrusion screw 32 in a direction to reduce the internal volume back again from position S2 to position S1, and actuate the extrusion screw 32 for rotation thereof, the liquefied material compresses, allowing the printing of the desired object to resume in a controlled manner.

In the embodiment shown in FIG. 2, the actuator 34 may also be arranged to drive the extrusion screw 32 in a reversible rotation direction. The actuator 34 may be driven, for example, by a belt drive, or by using a secondary screw thread. A rotation of the extrusion screw 32 in a reversible rotation direction retracts the liquefied material back into the internal volume enlargement unit 7 then formed by the internal volume of compression chamber 31 (left of the material feed unit 2 in the embodiment shown in FIG. 2). This prevents stringing, and the extruder based print head 1 may move to a different location for further printing.

Figure 3:
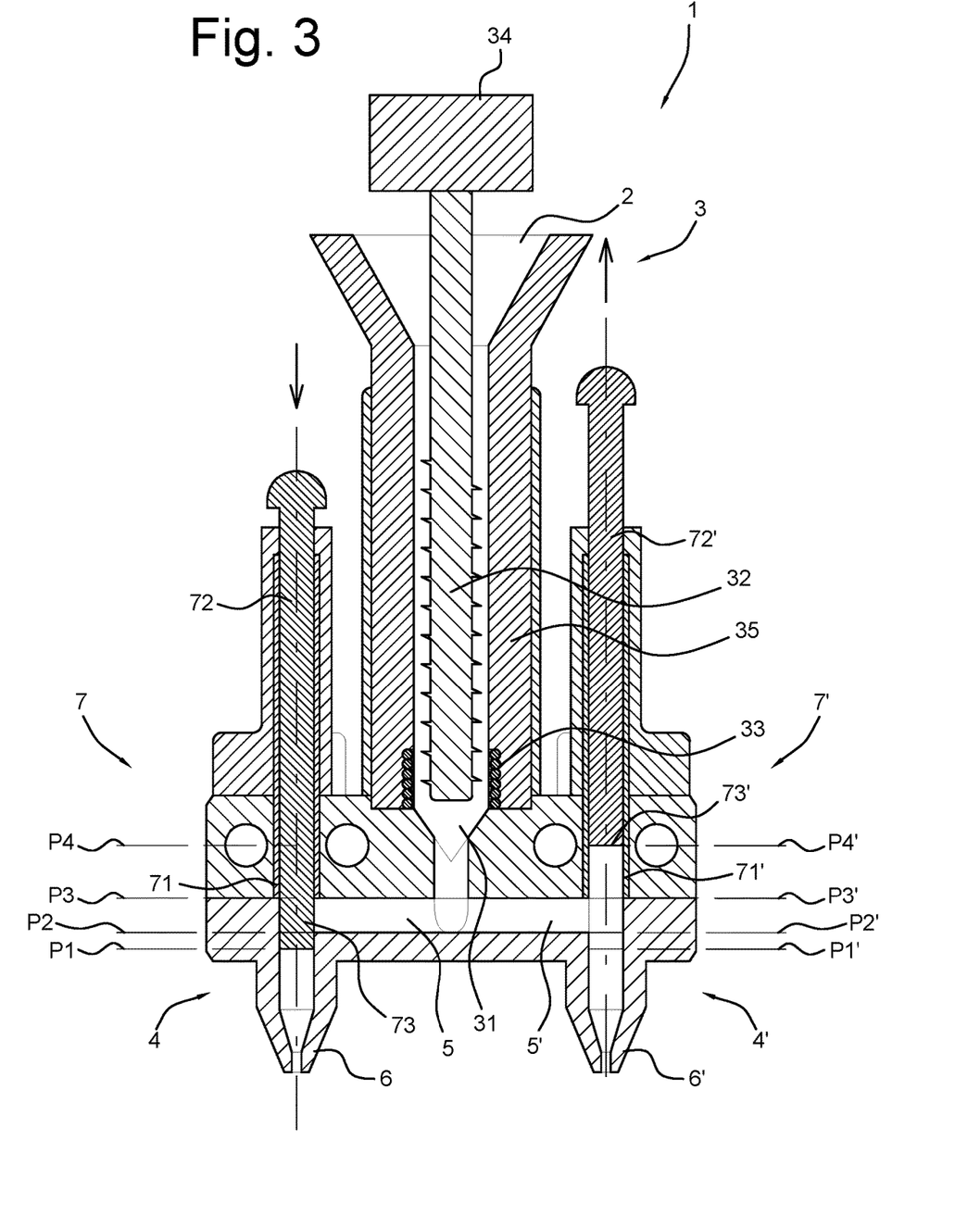
FIG. 3 shows a cross sectional view of an extruder based print head for 3D printing according to a multi-nozzle embodiment of the present invention.

FIG. 3 shows a cross sectional view of an extruder based print head for 3D printing according to a multi-nozzle embodiment of the present invention. In this embodiment, the liquefied material dispenses through multiple nozzles, allowing the retraction of the liquefied material in multiple nozzle units 4, 4'. Thus, in a further embodiment, one or more secondary nozzle units 4' in fluid communication with the material extrusion unit 3 are provided. The multiple nozzles units 4, 4' may comprise different nozzles 6, 6', e.g. having different size apertures. A larger aperture improves printing speed for fast assembly of printed objects. A smaller aperture improves precision for providing fine printed objects.

In the embodiment shown in FIG. 3, the secondary nozzle units 4' comprises secondary output channel 5' and secondary nozzle 6', arranged for output flow of the liquefied material. Each of the one or more secondary nozzle units 6' further comprises of one or more secondary internal volume enlargement units 7', in fluid communication with one or more secondary nozzle units 4', one or more secondary output channels 5', and the material extrusion unit 3.

In the embodiment shown in FIG. 3, the one or more secondary internal volume enlargement units 7' each comprises a secondary plunger channel 71' and a secondary plunger 72', arranged to retract the liquefied material. The secondary plungers 72' comprises a secondary valve devices 73', similar to the valve device 73 of the embodiments discussed above with reference to FIG. 1.

The one or more secondary internal enlargement units 7' have a first operational status, where the one or more secondary plungers are in the one or more secondary lower positions P2', and a second operation status, where the one or more secondary plungers 72' are in the one or more secondary upper positions P3'. The second internal volume is larger than the first internal volume.

In the embodiment shown in FIG. 3, the retraction of the liquefied material in one or more of secondary nozzle units 4' is identical to the retraction of the liquefied material in the nozzle unit 4 described in the first embodiment. Similarly, the operation of stopping the output flow in one or more of secondary nozzle units 4' is identical to the operation of stopping the output flow in the nozzle unit 4 described in the first group of embodiments above having a single nozzle unit 4.

Figure 4:
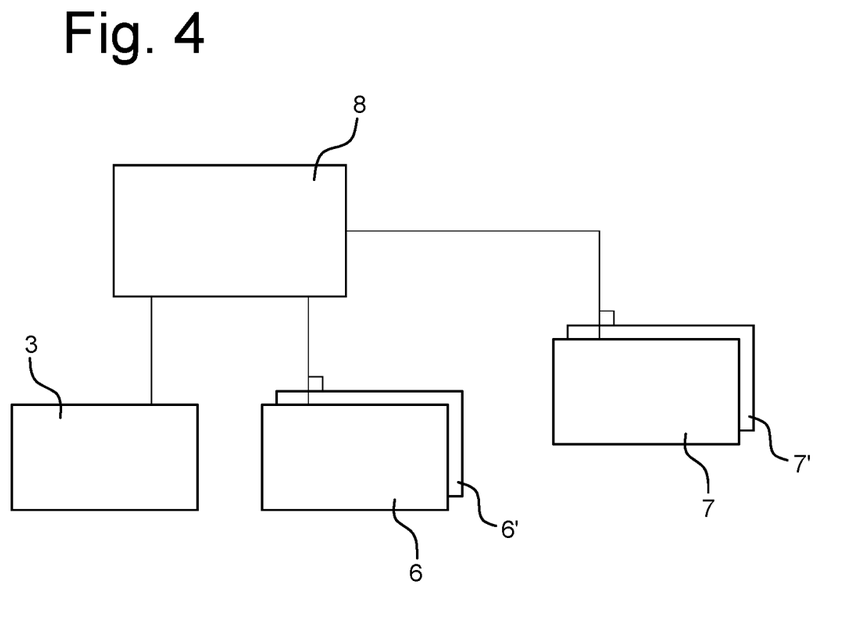
FIG. 4 shows a schematic diagram of a control arrangement for the extruder based print head for 3D printing according to an embodiment of the present invention.

FIG. 4 shows a schematic diagram of a control arrangement for the extruder based print head 1 for 3D printing according to an embodiment of the present invention. The control arrangement for the extruder based print head 1 comprises a control unit 8, which is arranged to control the output flow of liquefied material. The control unit 8 connects to the material extrusion unit 3, the internal volume enlargement unit 7, and nozzle 6. The control unit controls the nozzle 6 with one or more operational parameters associated with the material extrusion unit 3 and the internal volume enlargement unit 7.

In an embodiment, the one or more operational parameters comprise a speed and/or direction control parameters, and/or heating/cooling control parameters of the material extrusion unit 3 and/or the nozzle unit 4. The control unit 8 may control the speed and direction of the material extrusion unit 3 by, for example, changing the compression rate of the granular material in the compression chamber 31 and even retract by pumping the granular material back. The control unit 8 may control the heating function of the material extrusion unit 3, by, for example, changing an amplitude of the electrical current through the high-resistance wires of the temperature control element 33.

In a further embodiment, the one or more operational parameters further comprise an actuation of the internal volume enlargement unit 7 between the first and second operational status. The control unit 8 is e.g. arranged to control the valve device 73 and plunger 72. This allows the control unit 8 to have the internal volume enlargement unit 7 to be in the first operational status, stopping the output flow of the liquefied material by withdrawing the valve device 73 out of the plunger 72, and moving the plunger 72 upwards to extract the liquefied material. The control unit 8 can also equally have the internal volume enlargement unit 7 to be in the second operational status, restarting the output flow of the liquefied material by inserting the valve device 73 into the plunger 72, and moving the plunger 72 downwards to recompress the liquefied material.

In the embodiment shown in FIG. 4, the control unit 8 is implemented as a multiple nozzle control unit which also connects to the material extrusion unit 3, one or more secondary internal volume enlargement units 7' and one or more secondary nozzles 6'. This allows the control unit 8 to control the output flow of the liquefied material from one or more secondary nozzles 6', as discussed above with reference to FIG. 3. Furthermore, the control unit 8 may stop the output flow of the liquefied material from the nozzle unit 6, and switch the output flow of the liquefied material to one of the one or more secondary nozzle units 6'.

In a further exemplary embodiment, a multiple nozzle control unit 8 is connected to the material extrusion unit 3 and the internal volume enlargement unit 7. The multiple nozzle control unit 8 is arranged to switch between the nozzle unit 4 and one of the one or more secondary nozzle units 4' by actuating the internal volume enlargement unit 7 to stop flow when switching nozzles. [claim 13] The internal volume enlargement unit 7 can be in fluid communication with the one or more secondary nozzle units 4', or alternatively, each of the one or more secondary nozzle units 4' is provided with a secondary internal volume enlargement unit 7'. In that embodiment, all secondary internal volume enlargement units 7' are then also connected to the multiple nozzle control unit 8, as shown in FIG. 4.

Figure 5:
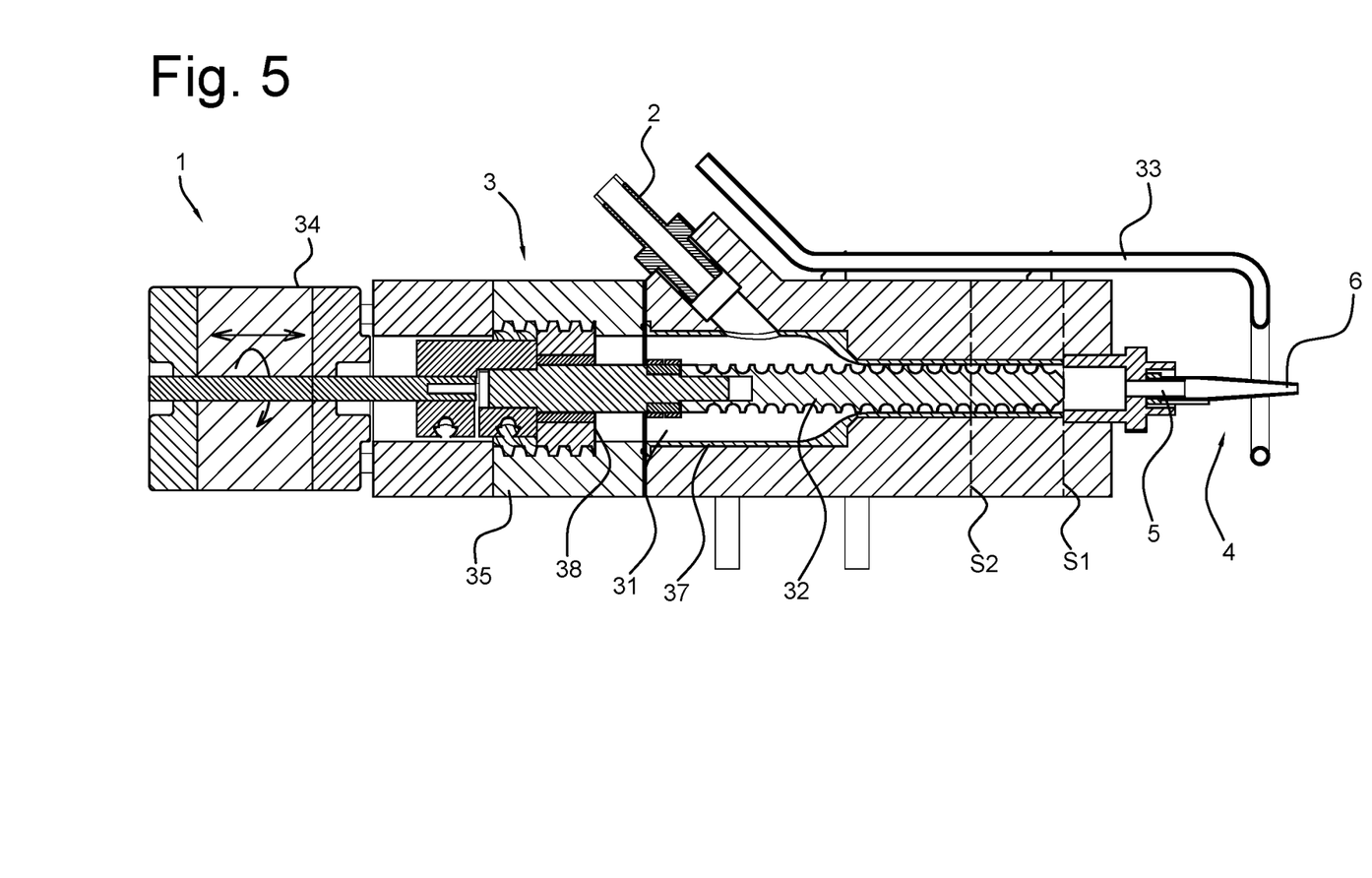
FIG. 5 shows a cross sectional view of an extruder based print head for 3D printing, according to an 'Auger valve' embodiment of the present invention.

FIG. 5 shows a cross sectional view of an extruder based print head 1 for 3D printing, according to an 'Auger valve' embodiment of the present invention. Elements with the same function as in the embodiments shown in FIGS. 1 and 2 are indicated by the same reference numerals.

In the Auger valve embodiment shown in FIG. 5, the material feed unit 2 may be connected, for example via a supply hose, to a syringe adapter assembly comprising a syringe barrel holding material in e.g. a liquid feed form. The syringe barrel may be e.g. permanently pressurized to provide material to the material feed unit 2. The material may then be received by the material extrusion unit 3 and nozzle unit 4, and dispensed through the nozzle 6, as described herein. In general, the Auger valve embodiment may also allow for the correct dosing of material provided in e.g. liquid feed form, and high accuracy dispensing of the liquefied material in print form for 3D printing.

Similar to the FIG. 2 embodiment described herein, in the Auger valve embodiment (shown in FIG. 5), an expansion volume S1-S2 is provided within the material expansion unit 3, whereby the actuator 34 is connected to the extrusion screw 32 for rotation thereof to compress material towards output channel 5, and linearly move the extrusion screw 32 within the expansion volume S1-S2 to retract the liquefied material, thereby preventing stringing. Moreover, the actuator 34 may also be arranged to drive the extrusion screw 32 with a reversible rotation direction, as described herein.

It is noted that during operation of the actuator 34, the extrusion screw 32 may first be driven in a reversible rotation direction and then, and at the same time, linearly retract within the expansion volume S1-S2, or vice-versa, to prevent stringing.

Figure 6A:
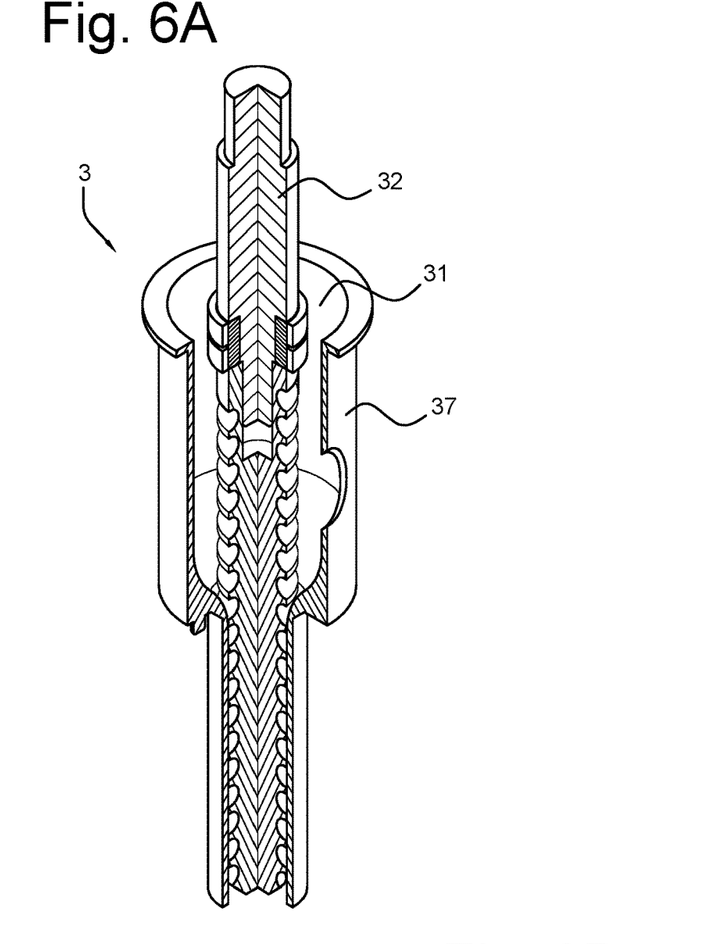
FIGS. 6A-B show a perspective view of a part of the material extrusion unit, according to two exemplary embodiments of the present invention.

In addition, in an advantageous embodiment shown in FIG. 5, and also shown in a perspective view in FIG. 6A, the material extrusion unit 3 may comprise a sleeve 37, wherein the sleeve 37 may be arranged to receive the material from the material feed unit 2.

As shown in FIGS. 5 and 6A, the compression chamber 31 and extrusion screw 32 may be provided within the sleeve 37, where, as shown in FIG. 6A, the sleeve 37 may comprise a funnel-shape body. From this standpoint, for material provided in liquid feed form to the material feed unit 2, the funnel-shaped body of the sleeve 37 may allow for better output of the liquefied material to the nozzle unit 6, and also allow better retraction of the liquefied material in the expansion volume S1-S2.

Figure 6B:
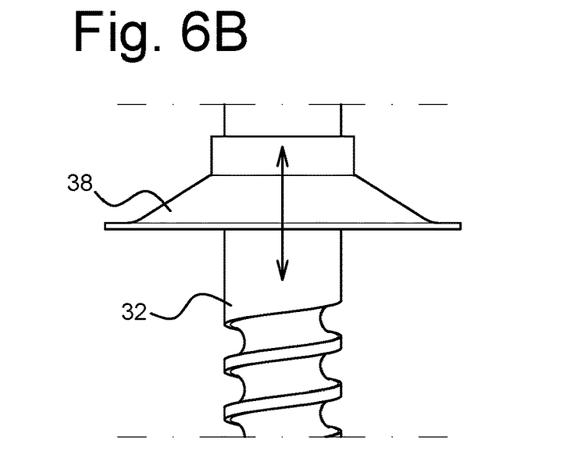

In the further advantageous embodiment shown in FIG. 5, and also shown in a perspective view in FIG. 6B, the material extrusion unit 3 may comprise a sealing element 38 connected to a part of the extrusion screw 32. The sealing element 38 is connected to a top part of the extrusion screw 32, e.g. above the threads of the extrusion screw 32 (as shown in FIG. 6B).

The sealing element 38 is arranged to seal off a (top) part of the material extrusion unit 3. Furthermore, during the linear movement of the extrusion screw 32 within the expansion volume S1-S2, the sealing element 38 is further arranged to press/compress against the liquefied material in the material extrusion unit 3, thereby allowing for improved output of the liquefied material through to the output channel 5 in the nozzle unit 4, and without any of the liquefied material leaking e.g. around the sides of the sealing element 38.

From this perspective, the sealing element 38 may comprise a shape similar to the cross-section plane of the material extrusion unit 3. To elaborate with a non-limiting example, if the material extrusion unit 3 comprises a cylindrical body, the sealing element 38 may comprise a disc-shaped element similar to cross-section of the cylindrical body.

According to an aspect of the present invention, a extruder based print head for 3D printing, as defined above, is provided, comprising a material feed unit for providing material in granular form, a material extrusion unit arranged to receive the material in granular form and transforming the material into liquefied material and a nozzle unit in fluid communication with the material extrusion unit, the nozzle unit comprising an output channel and a nozzle arranged to output the liquefied material. Furthermore, an internal volume enlargement unit is provided in fluid communication with the output channel of the nozzle unit, wherein the internal volume enlargement unit has a first internal volume in a first operational status and a second internal volume in a second operational status, wherein the second internal volume is larger than the first internal volume.

The present invention has been described above with reference to a number of exemplary embodiments as shown in the drawings. Modifications and alternative implementations of some parts or elements are possible, and are included in the scope of protection as defined in the appended claims.

The invention claimed is:

1. Extruder based print head for 3D printing, comprising
a material feed unit for providing material in granular and/or liquid feed form,
a material extrusion unit arranged to receive the material in granular and/or liquid feed form and transform the material into liquefied material in print form, and
a nozzle unit in fluid communication with the material extrusion unit, the nozzle unit comprising an output channel and a nozzle arranged to output the liquefied material,
further comprising an internal volume enlargement unit in fluid communication with the output channel of the nozzle unit,
wherein the internal volume enlargement unit has a first internal volume in a first operational status and a second internal volume in a second operational status, wherein the second internal volume is larger than the first internal volume, and
wherein the internal volume enlargement unit comprises an expansion volume within the material extrusion unit, and an actuator connected to an extrusion screw, which actuator is arranged to linearly move the extrusion screw within the expansion volume to retract the liquefied material into the expansion volume.

2. Extruder based print head according to claim 1, wherein the material extrusion unit comprises a compression chamber and the extrusion screw arranged to compress the material within the compression chamber.

3. Extruder based print head according to claim 1, wherein the material extrusion unit comprises a temperature control element in operative association with the compression chamber.

4. Extruder based print head according to claim 1, wherein the internal volume enlargement unit comprises a plunger channel in fluid communication with the nozzle and a plunger movably arranged within the plunger channel.

5. Extruder based print head according to claim 4, wherein the plunger further comprises a valve device arranged to close off the output channel.

6. Extruder based print head according to claim 1, wherein the internal volume enlargement unit is a part of the material extrusion unit, and an actuator connected to the extrusion screw, which actuator (34) is arranged to drive the extrusion screw with a reversible rotation direction.

7. Extruder based print head according to claim 1, wherein the material extrusion unit further comprises a sleeve.

8. Extruder based print head according to claim 1, wherein the material extrusion unit comprises a cylindrical housing.

9. Extruder based print head according to claim 1, further comprising a control unit connected to the material extrusion unit and the internal volume enlargement unit, wherein the control unit is arranged to control an output flow of liquefied material from the nozzle by controlling one or more operational parameters associated with the material extrusion unit and the internal volume enlargement unit.

10. Extruder based print head according to claim 9, wherein the one or more operational parameters comprise a speed and/or direction control parameters, and/or heating/cooling control parameters of the material extrusion unit and/or the nozzle unit.

11. Extruder based print head according to claim 9, wherein the one or more operational parameters comprise an actuation of the internal volume enlargement unit between the first and second operational status.

12. Extruder based print head according to claim 1, further comprising one or more secondary nozzle units in fluid communication with the material extrusion unit.

13. Extruder based print head according to claim 12, further comprising a multiple nozzle control unit connected to the material extrusion unit and the internal volume enlargement unit, wherein the multiple nozzle control unit is arranged to switch between the nozzle unit and one of the one or more secondary nozzle units by actuating the internal volume enlargement unit.

14. Extruder based print head according to claim 12, wherein the internal volume enlargement unit is in fluid communication with the one or more secondary nozzle units.

15. Extruder based print head according to claim 12, wherein each of the one or more secondary nozzle units is provided with a secondary internal volume enlargement unit.

* * * * *